Feb. 1, 1949.  J. W. WARD  2,460,404
CATALYTIC CONVERSION OF HYDROCARBONS
Filed Sept. 30, 1943
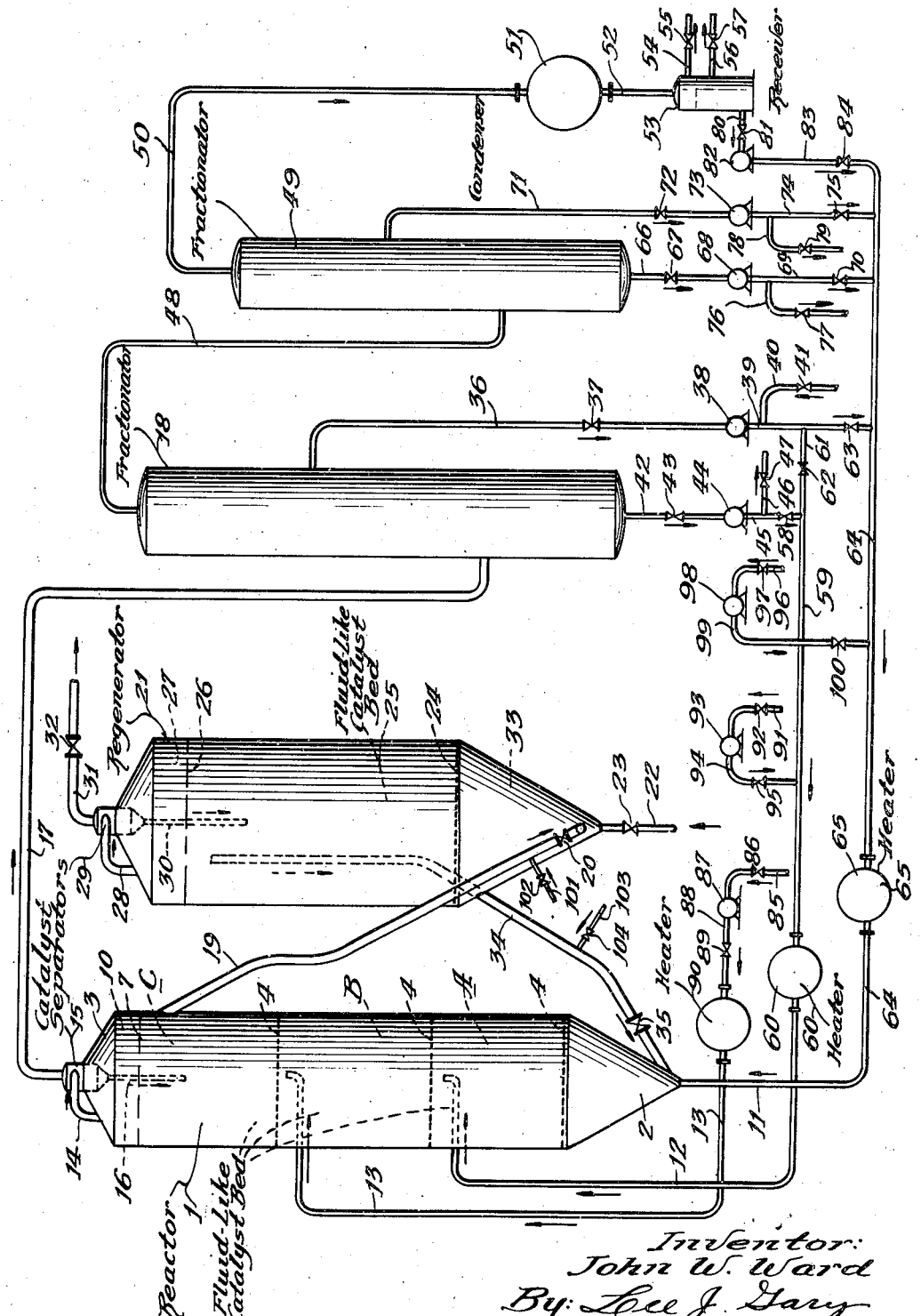
Inventor:
John W. Ward
By: Lee J. Gary
Attorney Patented Feb. 1, 1949

2,460,404

UNITED STATES PATENT OFFICE 2,460,404

CATALYTIC CONVERSION OF HYDROCARBONS

John W. Ward, Chicago, Ill., assignor to Universal Oil Products Company, Chicago, Ill., a corporation of Delaware Application September 30, 1943, Serial No. 504,460

7 Claims. (Cl. 196—52)

The invention relates to an improved process for the catalytic cracking of hydrocarbon oils to produce high yields of good quality motor gasoline or gasoline fractions suitable as base stock for aviation gasoline.

The invention embodies a plurality of interrelated and concomitantly operated cracking steps through which the catalyst employed for promoting the cracking reaction is passed serially without intermediate regeneration. The hydrocarbons to be converted comprise a plurality of normally liquid cracking stocks possessing different degrees of susceptibility to catalytic cracking treatment. The cracking zone or step to which the least susceptible or most refractory cracking stock is supplied receives fresh or freshly regenerated catalyst of relatively high activity. In the one or more succeeding steps, the fluid conversion products, resulting from the cracking treatment afforded said relatively refractory cracking stock, are further contacted with the same catalyst which now has a somewhat reduced activity due to the deposition of a deleterious contaminants thereon in the initial step. In addition, a cracking stock which is more susceptible to cracking treatment than that first mentioned is also supplied to the subsequent cracking step and contacted with the partially contaminated catalyst to effect cracking of said less refractory stock.

Two or more successive cracking steps through which the catalyst is passed in series before being regenerated may be employed within the scope of the invention and the contaminated catalyst from the final step of the series is regenerated to remove combustible contaminants therefrom and restore its activity, following which it is returned to the initial cracking step.

As an example of one specific mode of operation provided by the invention, a reaction vessel in which the cracking reactions are conducted is divided into three separate reaction zones through which subdivided solid cracking catalyst is passed in series. A fluid-like bed of the cracking catalyst is maintained in each of the reaction zones and an initial charging stock, comprising a virgin hydrocarbon oil, is passed only through the last zone of the series, together with fluid conversion products from the two preceding zones. Resulting fluid conversion products from the last zone of the series are fractionated to separate gasoline or naphtha fractions of the desired end-boiling point and gases from selected higher boiling fractions which are condensed in the fractionating step as reflux condensate. This selected reflux condensate, which is more refractory to cracking than the initial charging oil, is supplied to the second reaction zone of the series, through which it passes in commingled state with fluid products from the first reaction zone of the series, and thence with the initial charging oil through the third reaction zone above mentioned. Vapors and gases from the aforementioned fractionating step are further fractionated to separate light components, including normally gaseous fractions, from selected higher boiling fractions thereof, and the latter are supplied to the first cracking step of the series, from which the resulting conversion products pass through the second and third cracking steps, as previously mentioned.

In the specific operation above described, the stock supplied to the first cracking step of the series consists of or comprises fractions boiling within the range of gasoline which are retreated under suitable conditions in the presence of the freshly regenerated and relatively highly active catalyst to improve their characteristics and particularly to reduce their olefin content and make them more susceptible to improvement in antiknock value by the addition of antiknock agents, such as lead tetraethyl, for example. The term "catalytic cracking" as herein used is intended to include a retreating operation of this type, although it involves other reactions in addition to cracking.

The invention is, of course, not limited to the specific operation above outlined and I specifically contemplate an operation in which two or more cracking stocks of different refractivity to cracking are catalytically cracked in the successive reaction zones of the system through which the catalyst is passed. The various cracking stocks may be from any source and each or any of them may consist of fresh charging oil for the process or may comprise mixtures of fresh charging oil and intermediate liquid conversion products of the process of similar cracking susceptibility. The reaction zone of the series to which each individual cracking stock is supplied will depend upon the cracking susceptibility of that particular stock. The most active catalyst is used to promote the conversion of the most refractory stock and vice versa. In other words, catalyst of decreasing activity is contacted with the various cracking stocks in the order of their increasing susceptibility to catalytic cracking.

The relative refractiveness or cracking susceptibility of the oil supplied to each of the reaction zones is preferably determined on the basis of its characterization factor. The characterization factor of an oil is a numerical designation now commonly understood in the art, indicating the relative paraffinicity of the oil. As applied to pure individual hydrocarbons, the characterization factor (K) may be defined as the cube root of the absolute boiling point of the hydrocarbon, in degrees Rankin, divided by its specific gravity at 60° F. However, in dealing with complex mixtures of the nature of most cracking stocks, the characterization factor of the oil may be defined as the cube root of its cubic average boiling point in degrees Rankin, divided by its specific gravity at 60° F. The cubic average boiling point can be estimated from the volumetric average boiling point by subtracting from the latter a correction factor obtained by a correlation between the volume average boiling point and the slope of the Engler distillation curve for the oil (see article by Smith & Watson, Industrial & Engineering Chemistry, Dec. 1937). When the oil has a characterization factor of 12 or more, it is considered predominantly paraffinic. As the characterization factor decreases, the paraffinicity of the oil also decreases and its refractivity to cracking increases. For example, an oil having a characterization factor of 12 is materially more susceptible to cracking than an oil having a characterization factor of say 11.80 and an oil having a characterization factor of say 11.87 has an intermediate cracking susceptibility.

Assuming then that the present process is operated employing three different cracking stocks having the characterization factors 12.25, 11.80 and 11.72, for example, using the same catalyst successively in the several cracking steps without intermediate regeneration, the fresh or freshly regenerated catalyst is first employed in the reaction zone to which the cracking stock having the K value of 11.72 is supplied. It is next used in the reaction zone handling the cracking stock having the K value of 11.80 and then is employed to crack the stock having the K value of 12.25, following which the catalyst is regenerated and returned to the first mentioned cracking step. This general principle of employing catalyst of increasing cracking activity for stocks of decreasing cracking susceptibility is employed in the preferred embodiment of the invention regardless of the source of the particular stock being treated in the respective cracking steps.

It will be understood, of course, that the decreasing activity of the catalyst passing through the successive reaction zones is due principally to the accumulation thereon in each zone of deleterious combustible conversion products resulting from the cracking reaction conducted therein. When, as in the preferred embodiment of the invention, the catalyst bed in each zone is maintained in a fluid-like condition, the activity of the catalyst throughout each individual bed of the series will be substantially uniform due to the turbulence and mixing obtained therein, but its average activity will be somewhat lower in each successive bed due to the accumulation of contaminating deposits thereon.

With catalyst of the preferred type employed in the present process, I have found that catalyst which carries a substantial deposit of the heavy combustible products known as "catalyst coke" are entirely satisfactory for promoting the conversion of oils having a relatively high characterization factor. For example, catalyst containing 3 to 4% by weight or thereabouts of such deposits is still active for promoting the conversion of oils having a characterization factor of say 11.80 to 12 or more. On the other hand, oils having a relatively low characterization factor, such as, for example, olefinic gasoline fractions and naphtha, require for best results in their cracking or retreatment a relatively clean and more highly active catalyst containing, for example, not more than about 1% by weight of "catalyst coke" and preferably less. Oils having an intermediate characterization factor can be successfully cracked with catalysts of intermediate activity. For example, the total reflux condensate formed by fractionation of the vaporous products resulting from the cracking of a highly paraffinic oil may be successfully further converted to produce additional yields of good quality gasoline, using a catalyst containing from 1% to 3% by weight of deposited contaminants.

The invention takes advantage of the above findings by operating the regenerating step of the process to reduce the catalyst deposits to a relatively low value suitable for promoting cracking of the most refractory cracking stock to be converted therein and using the resulting partially spent catalyst to promote the conversion of one or more less refractory stocks before it is again regenerated.

Another important feature of the invention resides in the provision for passing fluid conversion products resulting from the cracking treatment of a relatively refractory stock through the successive reaction zone or zones of the series with the additional less refractory stock or stocks supplied thereto. This not only affords more prolonged conversion time for the more refractory cracking stock, as compared with that afforded those of a less refractory nature, but also increases the space velocity in those reaction zones of the series to which the less refractory stocks are supplied, as compared with the space velocity employed in the preceding reaction zone wherein the more refractory stock is converted. This applies, of course, to operations in which the catalyst bed in each reaction zone contains substantially the same quantity of catalyst, and the relative space velocities in the several zones may be varied within reasonable limits to suit requirements by varying the catalyst inventory therein.

The term "space velocity" as herein used refers to the quantity of hydrocarbons contacted in a given time with the unit quantity of catalyst in the reaction zone. It can conveniently be expressed as pounds of hydrocarbons passed through the reaction zone per hour, per pound of catalyst present in the reaction zone.

The feature of increasing space velocity in the successive reaction zones is advantageous in that the relatively refractory cracking stocks are advantageously converted at a relative low space velocity, while higher space velocities can be successfully employed to advantage on less refractory stocks. For example, the retreatment of olefinic gasoline and naphtha fractions to reduce their bromide number and increase their lead susceptibility, not only requires a relatively active and clean cracking catalyst, but also requires relatively low space velocities, preferably within the range of 0.25 to 1, or thereabouts. Highly paraffinic higher boiling oils on the other hand are advantageously cracked at higher space velocities which may range, for example, from 1 to 8, or thereabouts, depending upon their characterization factor and the type of product desired.

The passage of fluid hydrocarbon conversion products from the reaction zone in which a relatively refractory stock is converted through the successive zone in which a less refractory stock is converted, offers the further advantage of reducing the effective operating pressure in the zone handling the stock which is most susceptible to cracking, thus reducing thermal cracking of the stock which is most susceptible thereto. Thermal cracking is detrimental in that it degrades the quality of the gasoline product as compared with that obtained by catalytic cracking.

The cracking catalyst preferably employed in the present process is of the siliceous type comprising a composite of silica with one or more metal oxides of which alumina, zirconia and magnesia are the most commonly employed. Such catalyst and various satisfactory methods of preparing the same are now well known in the art and the present invention is not concerned with their specific composition or method of preparation, except that they are preferably low in or substantially free of alkali metal compounds. Either a treated natural clay or similar alumino silicate or a catalyst prepared by any of the several synthetic methods may be employed within the scope of the invention. Removal of all or substantially all alkali metal compounds contained in the raw materials during some stage in the preparation of the catalyst is necessary to avoid rapid degradation or destruction of its activity by regeneration at the relatively high temperatures commonly employed.

The accompanying drawing diagrammatically illustrates one specific form of apparatus embodying the features of the invention and in which the improved process may be conducted.

Referring to the drawing, reactor 1 is a vertically elongated, substantially cylindrical vessel closed at its opposite ends by the respective bottom and top heads 2 and 3. The interior of the vessel is divided into the reaction zones A, B and C by the spaced perforate partition members 4 which may be perforate plates or other suitable grid-like structures extending over the cross-sectional area of the vessel at spaced points in its height and secured to the cylindrical shell of the reactor. The members 4 also serve as distributing means for substantially evenly distributing catalyst particles and fluid reactants and conversion products over the horizontal cross-section of the vessel.

A bed of subdivided solid catalyst is disposed within the reactor above the partitioning and distributing members 4 in each of the reaction zones A, B and C. In the embodiment of the invention here illustrated, these catalyst beds are each kept in a fluid-like condition by passing fluid hydrocarbon reactants to be converted and resulting fluid conversion products upwardly therethrough at a velocity sufficient to partially counteract the force of gravity on the catalyst particles.

A stream of fresh catalyst particles or catalyst regenerated, as will be later described, is supplied to the space within the cone bottom 2 beneath the lowermost member 4 and is picked up and carried into the fluid bed in reaction zone A by an incoming stream of hydrocarbons to be converted, which is supplied to the lower portion of the reactor through line 11. Conditions of temperature, pressure and space velocity, suitable for substantial cracking of the oil supplied through line 11 are maintained in zone A as it passes upwardly through the fluid-like catalyst bed in this zone.

Another stream of hydrocarbons to be converted, of a less refractory nature than the oil supplied through line 11, is introduced into the upper portion of reaction zone A beneath the second perforate member 4 through line 12 and commingles with the hydrocarbon vapors and gases passing from the fluid bed in this zone and the mixture carries catalyst particles from the latter through the perforate member 4 into the fluid-like bed maintained in reactor B. Suitable conditions of temperature, pressure and space velocity are maintained in reaction zone B for cracking the oil supplied through line 12, in the presence of catalyst which has previously served to promote the cracking reaction in reaction zone A, as the oil passes with the conversion products from the latter zone through the fluid-like bed in reactor B.

Another stream of hydrocarbons to be converted is supplied to the upper portion of reaction zone B beneath the third member 4 through line 13 and commingles therein with the vaporous and gaseous hydrocarbon conversion products passing from the fluid bed in this zone and the mixture transports catalyst particles from the fluid bed in reaction zone B through member 4 into the fluid-like bed of catalyst maintained in reaction zone C. The hydrocarbons supplied through line 13 are of a less refractory nature or more susceptible to cracking treatment than those supplied through line 12 and suitable conditions of temperature, pressure and space velocity for cracking the same are maintained in the reaction zone C as they pass upwardly through the fluid bed in this zone in contact with the catalyst which has been previously used for promoting the conversion reaction in reaction zones A and B.

The lifting action of the vapors and gases on the catalyst particles is largely overcome by the force of gravity in the upper portion of zone C and a light phase 10, of materially lower catalyst particles concentration than that prevailing in the fluid beds, is maintained above the upper extremity, indicated approximately at 7, of the fluid bed in reaction zone C. Vaporous and gaseous conversion products of the cracking reaction conducted in reaction zones A, B and C are directed with entrained catalyst particles from the light phase 10 in reaction zone C through line 14 to suitable catalyst separating equipment, such as, for example, the cyclone separator indicated at 15, wherein at least a major portion of the entrained catalyst is separated from the hydrocarbon vapors and gases. The separated catalyst particles are returned from separator 15 through standpipe 16 to the fluid-like catalyst bed in reaction zone C, in the case illustrated. However, when desired, catalyst from separator 15 may be returned to any or in part to each of the fluid beds in the reaction zones A, B and C or it may be supplied directly to the regenerating step of the process by well known means, not illustrated. Hydrocarbon vapors and gases are directed from the upper portion of separator 15 through line 17 to fractionation, as will be later described, in fractionator 18.

A stream of catalyst particles containing contaminating deposits accumulated thereon in reaction zones A, B and C is withdrawn from the fluid-like bed in the latter zone beneath the dense phase level 7 and directed through transfer line 19 and the adjustable orifice or flow control valve 20 to the catalyst regenerating step of the process. In the case illustrated, transfer line 19 extends into the space 33 provided within the cone-like bottom head of the regenerating vessel 21 and is picked up by an incoming stream of air or other oxidizing gas employed for effecting regeneration of the catalyst. The oxidizing gas is supplied to the lower portion of the regenerator through line 22 and valve 23 and transports the catalyst particles from line 19 through the perforate distributing member 24, provided adjacent the juncture of the conical lower head with the cylindrical shell of the regenerator, into the fluid-like bed 25 of catalyst particles maintained within the regenerating zone. The approximate upper extremity of this fluid bed is indicated at 26 and a light phase 27 of materially reduced catalyst particle concentration is maintained above the fluid bed in the regenerator. When desired, instead of being supplied to the lower portion of the regenerator, transfer line 19 may terminate at any desired point within the fluid bed 25.

Combustion gases resulting from the regenerating operation and entrained catalyst particles are directed from the light phase 27 in the regenerator through line 28 to the catalyst separator 29 wherefrom separated catalyst particles are returned through standpipe 30 to the fluid bed 25 in the regenerator. The combustion gases are directed from the upper portion of the separator through line 31 and valve 32, preferably to suitable heat recovery equipment, not illustrated.

A stream of regenerated catalyst is withdrawn from the fluid bed 25 in the regenerator and directed through transfer line 34 and the adjustable orifice or flow control valve 35 into the lower portion of reactor 1, wherein it is picked up by the incoming stream of hydrocarbons from line 11 and passes in series, as previously described, through the fluid beds in reaction zones A, B and C.

The fractionation afforded the vaporous and gaseous conversion products from line 17 in fractionator 18 separates normally gaseous components and light normally liquid fractions of the desired end-boiling point from the higher boiling fractions which are condensed as reflux condensate in this zone. In the case illustrated, two selected streams of reflux condensate of different boiling range characteristics are withdrawn from fractionator 18. The lighter stream is directed through line 36 and valve 37 to pump 38 from which it is directed through line 39 and may, when desired, be discharged, all or in part, from the system to cooling and storage, or elsewhere as desired, through line 40 and valve 41. Heavier fractions of the reflux condensate formed in fractionator 18 are directed from the lower portion of this zone through line 42 and valve 43 to pump 44 wherefrom they are directed through line 45 and may, when desired, be discharged, all or in part, from the system through line 46 and valve 47 to cooling and storage or elsewhere, as desired.

Fractionated vapors and gases of the desired end-boiling point, preferably including substantially all of the gasoline fractions, are directed from the upper portion of fractionator 18 through line 48 to fractionator 49, wherein a further separation between light and heavy components thereof is effected. The lighter fractions, preferably including substantially all of the normally gaseous products and light gasoline fractions, are directed from the upper portion of the fractionator through line 50 to condenser 51 wherefrom the resulting distillate and uncondensed and undissolved gases are directed through line 52 to collection and separation in receiver 53. The uncondensed and undissolved gases are discharged from the receiver through line 54 and valve 55 to storage or preferably to suitable gas concentrating and recovery equipment, not illustrated. Distillate, such as selected light gasoline fractions, may be directed from receiver 53 through line 56 and valve 57 to storage or elsewhere, as desired.

The arrangement here illustrated permits the use of any one or several selected intermediate liquid products as all or a portion of the cracking stock supplied through lines 11 and 12 to the respective reaction zones A and B. For example, a selected relatively heavy fraction of the reflux condensate formed in fractionator 18 and withdrawn from the lower portion of this zone through line 42 to pump 44 may be directed, all or in part, through valve 58 in line 45 and through line 59 to heater 60, and thence through line 12 into reaction zone B in the manner previously described. Alternatively, a selected light fraction of the reflux condensate formed in fractionator 18 and withdrawn through line 36 to pump 38 may be directed, all or in part, from line 39 through line 61, valve 62 and line 59 to heater 60 and thence through line 12 to reaction zone B, or a regulated quantity or all of the light reflux condensate may be directed through valve 63 in line 39 and through line 64 to heater 65 and thence through line 11 into reaction zone A. Another alternative mode of operation is to withdraw the total reflux condensate formed in fractionator 18 through line 42 and return all or a regulated portion thereof via pump 44, line 45, valve 58, line 59, heater 60 and line 12 to reaction zone B.

A similar arrangement is provided, in the case illustrated, for supplying a portion or all of the reflux condensate formed in fractionator 49 to further conversion in reaction zone A. Selected heavy fractions of the reflux condensate formed in fractionator 49 may be directed from the lower portion thereof through line 66 and valve 67 to pump 68 and thence through line 69, valve 70, line 64, heater 65 and line 11 to reaction zone A. Selected light fractions of the reflux condensate formed in fractionator 49 may be directed through line 71 and valve 72 to pump 73 and thence through line 74, valve 75, line 64, heater 65 and line 11 to reaction zone A. Alternatively, the total reflux condensate formed in fractionator 49 may be withdrawn from the lower portion of this zone to pump 68 and supplied, all or in part, when desired, to reaction zone A. Provision is also made for removing all or a portion of the total or the heavy reflux condensate formed in fractionator 49 from the system through line 76 and valve 77 communicating with line 69. Similarly, a portion or all of any light reflux condensate withdrawn from fractionator 49 may be supplied to cooling and storage or elsewhere, as desired, through line 78 and valve 79 communicating with line 74.

When desired, regulated quantities of the distillate, comprising gasoline fractions of the desired end-boiling point collected in receiver 53, may be supplied to reaction zone A for retreatment to improve their quality. When this mode of operation is employed, distillate may be supplied from receiver 53 through line 80 and valve 81 to pump 82 from which it is supplied through line 83, valve 84, line 64, heater 65 and line 11 to the reaction zone A.

Fresh charging oil for the process, which is preferably a straight-run distillate, such as gas oil or the like, having a relatively high characterization factor as compared with the other oils converted within the system, is supplied through line 85 and valve 86 to pump 87 wherefrom it is fed through line 88, valve 89, heater 90 and line 13 to cracking treatment in reaction zone C.

When desired, in addition to or instead of supplying selected intermediate liquid products of the process to cracking treatment in reaction zone B, another cracking stock from an external source, having a lower characterization factor than that supplied through line 85, is directed through line 91 and valve 92 to pump 93 by means of which it is fed through line 94, valve 95, line 59, heater 60 and line 12 to cracking treatment in reaction zone B.

The invention also contemplates the use of another stream of extraneous oil as all or a portion of the cracking stock supplied to reaction zone A. This material may be supplied through line 96 and valve 97 to pump 98 wherefrom it is fed through line 99, valve 100, line 64, heater 65 and line 11 to reaction zone A.

The purpose of heaters 65, 60 and 90 is to preheat and preferably substantially vaporize the cracking stock supplied to the respective reaction zones A, B and C through lines 11, 12 and 13 and, in the preferred embodiment of the invention, heaters 60 and 90 also preferably supply to the respective cracking stocks passing therethrough the heat necessary to bring them to or somewhat above the reaction temperature employed in the particular reaction zone to which this oil is supplied. The hot regenerated catalyst supplied to the reactor through line 34 will furnish a substantial portion of the required heat for conducting the cracking reactions in zones A, B and C and may, when desired, also furnish heat for vaporizing and/or for bringing the cracking stock supplied to zone A to the desired reaction temperature. Thus, heater 65 may be eliminated, when desired. The heaters 60, 65 and 90 may be of any suitable form and are illustrated only in a conventional manner in the drawing.

Preferably, the stream of catalyst particles passing through line 19 is substantially stripped of occluded light hydrocarbons, prior to its introduction into the regenerating zone. This is accomplished in the case illustrated by introducing regulated quantities of steam or other suitable relatively inert or non-combustible gas into line 19 through line 101 and valve 102 on the upstream side of the adjustable orifice or flow control valve 20. Similarly, steam or other relatively inert gas is supplied in regulated amounts to line 34 on the upstream side of the adjustable orifice or flow control valve 35 through line 103 and valve 104, to substantially strip the stream of catalyst passing through this line of oxidizing gas and combustion gases. The gas thus supplied to lines 19 and 34 also serves to aerate and prevent excessive compaction of the catalyst columns in the transfer lines, so as to insure the continuous flow of catalyst particles therethrough.

A detailed recitation of operating conditions suitable for conducting the process with specific cracking stocks of various characterization factors is considered unnecessary to an understanding of the invention, since suitable conditions of temperature, pressure, space velocity, etc., for cracking various types of oils are known to those familiar with the art. In general, however, temperatures ranging from 850 to 1050° F. are most commonly employed with the silica-alumina type cracking catalysts in common use. The operating pressure in the reaction zones may range from substantially atmospheric to several hundred pounds, superatmospheric, and a moderately superatmospheric pressure of from 5 to 50 pounds gauge, or thereabouts, is preferred in operations of the fluid bed type such as preferably employed in the present process. The weight hourly space velocities employed in the reaction zones may range from 0.25 to 8 or thereabouts. Space velocities of a relatively low order, say 0.5 to 1, are preferred for highly refractory stocks (those having a low characterization factor), while higher space velocities are advantageously employed in stocks having higher characterization factors. Also space velocities of a somewhat higher order may be employed for the production of motor gasoline, as compared with those most suitable for the production of aviation base stock.

I claim:

1. A catalytic cracking process which comprises introducing relatively clean and active subdivided solid cracking catalyst to the first of a series of at least three reaction zones maintained under cracking conditions, passing catalyst from the first to the second and from the second to the third zone of the series whereby to maintain a continuous flow of catalyst through said series of zones, introducing to said third zone a hydrocarbon charging oil heavier than gasoline and therein cracking a substantial portion thereof in contact with used catalyst from said second zone, removing cracked vapors and catalyst from the third zone and fractionating the vapors to condense and separate hydrocarbons heavier than gasoline, introducing at least a portion of the last-named hydrocarbons to said second zone and therein subjecting the same to further cracking in contact with used catalyst from said first zone, passing resultant cracked vapors from the second zone to the third zone for further treatment therein, and passing an olefinic gasoline fraction serially through said first, second and third zones in the order named under conditions to reduce the olefin content thereof.

2. A catalytic cracking process which comprises introducing relatively clean and active subdivided solid cracking catalyst to the first of a series of at least three reaction zones maintained under cracking conditions, passing catalyst from the first to the second and from the second to the third zone of the series whereby to maintain a continuous flow of catalyst through said series of zones, passing a hydrocarbon distillate comprising gasoline fractions through said first, second and third zones in the order named, introducing to said third zone a hydrocarbon charging oil heavier than gasoline and therein cracking a substantial portion thereof, removing from the third zone the vaporous conversion products of said distillate and charging oil and fractionating the same to condense and separate fractions thereof heavier than gasoline, and introducing at least a portion of the last-named fractions to said second zone and passing the same through the second and third zones for further cracking treatment therein.

3. A catalytic cracking process which comprises maintaining a series of vertically disposed fluidized beds of subdivided solid cracking catalyst under cracking conditions, supplying relatively active catalyst particles to the lowermost bed of the series and removing contaminated catalyst particles from the uppermost bed, introducing a virgin petroleum oil to said uppermost bed of the series and therein effecting substantial cracking of the oil, removing the cracked vapors and fractionating the same to separate insufficiently converted fractions thereof, introducing at least a portion of said fractions to a bed of said series below said uppermost bed for further conversion therein, and introducing resultant vaporous conversion products containing suspended catalyst particles to the uppermost bed.

4. A catalytic cracking process which comprises maintaining a series of reaction zones under cracking conditions, supplying relatively active subdivided solid cracking catalyst to the first zone of the series and removing contaminated catalyst particles from the last zone of the series, introducing a virgin petroleum oil to said last zone of the series and therein effecting substantial cracking thereof, removing the cracked vapors and insufficiently fractionating the same to separate converted fractions thereof, introducing at least a portion of said fractions to a zone of the series preceding said last zone for further conversion therein, and introducing resultant vaporous conversion products containing suspended catalyst particles to said last zone of the series.

5. In a process for the catalytic cracking of a hydrocarbon oil to produce valuable normally gaseous and normally liquid hydrocarbon products of lower molecular weight and boiling point in a catalytic cracking system using a fluidized finely divided cracking catalyst, the method of operation comprising the steps of introducing the fresh hydrocarbon oil feed to be cracked at one or more intermediate points into a bed of continuously replenished fluidized finely divided cracking catalyst constituting the cracking zone wherein it is catalytically cracked in the presence of recycle stock introduced as hereinafter specified, continuously withdrawing spent catalyst from said fluidized bed and continuously regenerating said withdrawn spent catalyst in a separate regeneration zone by burning carbonaceous deposits therefrom, separating from the product from said cracking zone by fractionation a lower boiling product fraction and a higher boiling recycle fraction consisting largely of uncracked and partially cracked products of said feed, contacting at least a portion of said higher boiling fraction with the hot freshly regenerated catalyst from said regeneration zone and passing the mixture to said cracking zone by introducing said mixture at the bottom of said bed of fluidized finely divided cracking catalyst, thereby to simultaneously crack said fresh hydrocarbon feed and said recycled fraction in the same bed of fluidized finely divided cracking catalyst at different space velocities while avoiding contact of the said fresh hydrocarbon feed with said hot freshly regenerated catalyst.

6. In a process for the catalytic cracking of a hydrocarbon oil to produce valuable normally gaseous and normally liquid hydrocarbon products of lower molecular weight and boiling point in a catalytic cracking system using a fluidized finely divided cracking catalyst, the method of operation comprising the steps of introducing the fresh hydrocarbon oil feed to be cracked at one or more intermediate points into a bed of continuously replenished fluidized finely divided cracking catalyst constituting the cracking zone wherein it is catalytically cracked in the presence of recycle stock introduced as hereinafter specified, continuously withdrawing spent catalyst from said fluidized bed and continuously regenerating said withdrawn spent catalyst in a separate regeneration zone by burning carbonaceous deposits therefrom, separating from the product from said cracking zone by fractionation a lower boiling product fraction, a high boiling fraction and an intermediate fraction consisting largely of uncracked and partially cracked products of said feed, contacting at least a portion of said intermediate fraction with the hot freshly regenerated catalyst from said regeneration zone and passing the mixture to said cracking zone by introducing said mixture at the bottom of said bed of fluidized finely divided cracking catalyst, thereby to simultaneously crack said fresh hydrocarbon feed and said recycled fraction in the same bed of fluidized finely divided cracking catalyst at different space velocities while avoiding contact of the said fresh hydrocarbon feed with said hot freshly regenerated catalyst.

7. In a process for the catalytic cracking of a hydrocarbon oil to produce valuable normally gaseous and normally liquid hydrocarbon products of lower molecular weight and boiling point in a catalytic cracking system using a fluidized finely divided cracking catalyst, the method of operation comprising the steps of introducing a straight run gas oil at one or more intermediate points into a bed of continuously replenished fluidized finely divided cracking catalyst constituting the cracking zone wherein it is catalytically cracked in the presence of recycle stock introduced as hereinafter specified, continuously withdrawing spent catalyst from said fluidized bed and continuously regenerating said spent catalyst in a separate regeneration zone by burning carbonaceous deposits therefrom, separating from the product from said cracking zone by fractionation a lower boiling product fraction and a higher boiling fraction consisting largely of uncracked and partially cracked products of said feed, contacting at least a portion of said higher boiling fraction with the hot freshly regenerated catalyst from said regeneration zone and passing the mixture to the cracking zone by introducing said mixture at the bottom of said bed of fluidized finely divided cracking catalyst, thereby to simultaneously crack said hydrocarbon feed and said recycled fraction in the same bed of fluidized finely divided cracking catalyst at different space velocities while avoiding contact of the fresh hydrocarbon feed with said hot freshly regenerated catalyst.

JOHN W. WARD.

REFERENCES CITED

The following references are of record in the file of this patent:

| Number | Name | Date |
| --- | --- | --- |
| 1,867,841 | Joseph | July 19, 1932 |
| 2,235,133 | Zimmerman | Mar. 18, 1941 |
| 2,296,722 | Marancik, et al | Sept. 22, 1942 |
| 2,298,355 | Egloff | Oct. 13, 1942 |
| 2,300,032 | Kassel | Oct. 27, 1942 |
| 2,304,128 | Thomas | Dec. 8, 1942 |
| 2,322,794 | Egloff | June 29, 1943 |
| 2,326,705 | Thiele, et al | Aug. 10, 1943 |
| 2,327,175 | Conn | Aug. 17, 1943 |
| 2,328,754 | Thomas | Sept. 7, 1943 |
| 2,356,697 | Rial | Aug. 22, 1944 |
| 2,338,573 | Creelman | Jan. 4, 1944 |
| 2,377,613 | Conn | June 5, 1945 |
| 2,379,711 | Hemminger | July 3, 1945 |